United States Patent Office 3,472,897
Patented Oct. 14, 1969

3,472,897
REDUCTION OF NITROBENZENE
James N. Pryor, Baltimore, and Orville A. Wunderlich, Lutherville, Md., assignors to W. R. Grace & Co., New York, N.Y., a corporation of Connecticut
No Drawing. Original application June 13, 1963, Ser. No. 287,471. Divided and this application Dec. 22, 1966, Ser. No. 632,465
Int. Cl. C07c 85/10
U.S. Cl. 260—580                                                    1 Claim

ABSTRACT OF THE DISCLOSURE

Aromatic organic nitro compounds are reduced with hydrogen in the presence of a catalyst which comprises platinum or palladium deposited upon an eta alumina support.

---

This is a division of application Ser. No. 287,471, filed June 13, 1963 now abandoned.

This invention is directed to the preparation of improved hydrogenation catalysts and their use in catalytic hydrogenation. The catalyst of this invention results in certain marked improvements in hydrogenations where organic compounds are reduced. In one specific aspect, this invention relates to the preparation of palladium hydrogenation catalyst on an eta alumina base, and the catalyst as the composition of matter.

Catalytic hydrogenation is commonly used in the reduction of aromatic and aliphatic nitro compounds to amines, in the conversion of acids, esters and ketones to alcohols, and in the hardening of fats. It is desirable to achieve a high production range at minimum cost. However, this result can only be realized if the rate of hydrogenation is greatly increased without requiring a corresponding high concentration of expensive noble metal catalysts.

It is know that the hydrogenation rates are influenced by many factors in catalytic hydrogenation reactions. These factors include the presence of catalytic activators or poisons, temperature, pressure, solvent, agitation and other conditions specific to the particular process involved. One of the more important considerations is the catalyst support. This invention relates to a process for preparing a palladium hydrogenation catalyst on an eta alumina support.

One disadvantage inherent in the carbon based hydrogenation catalyst used heretofore is the fact that the catalysts are very soft and have poor attrition characteristics. When the object of the catalytic hydrogenation is to prepare amines by the catalytic hydrogenation of nitro compounds to the corresponding amine, for example, this reduction is a step-wise procedure passing through several intermediate reduction products. These intermediates are often deposited on the catalyst and prevent further reduction from occurring in an efficient manner. As a result, large amounts of tars are formed, yields are low and the quality of the final product leaves much to be desired.

It is the object of this invention to prepare an improved hydrogenation catalyst for the efficient reduction of organic compounds which have higher density than the conventional carbon catalyst, an improved attrition profile and other desirable characteristics.

It is the further object of this invention to improve the general overall characteristics of the hydrogenation catalyst by utilizing a high purity eta alumina as a support for a noble metal hydrogenation catalyst. It has been found that the rate of hydrogenation can be increased still further if the catalyst supported on the eta alumina is palladium which has been activated by a metal oxide or a metal carbonate.

It is well known how to effect the hydrogenation of nitro compounds and other hydrogenation reactions using platinum and palladium catalysts supported on carbon. However, these conventional carbon supports are porous in nature and are mainly of vegetable or animal origin. Their stability is poor and because they are supported on carbon cannot be subjected to any regeneration which would eliminate the tars formed on the catalyst. Use of the eta alumina support produces an improvement in the general physical characteristics of the catalyst. The eta alumina support is a very pure alumina. The purity of the eta alumina is one of the critical features of the instant invention.

It is very desirable to have an extended surface upon which the catalytic metal can be deposited. The surface area range of catalytic supports is generally in the order of 300 to 1200 m.$^2$ per gram as measured by nitrogen adsorption. The eta alumina support is classified as a high surface area material having a surface area in the range of 100 to 500 m.$^2$/g.

The process of preparing ultra pure eta alumina is not part of this invention. Broadly speaking, this eta alumina is prepared by preparing an amalgam of aluminum by mixing aluminum metal powder with mercury. The amalgam is then treated with pentasol to form the alcoholate. The alcoholate is hydrolyzed with water to prepare the alumina beta trihydrate. The beta trihydrate is converted to eta alumina by calcination at 1050° F. for 3½ hours. Eta alumina prepared by this technique is a highly pure form of alumina. The high purity of this product makes it attractive as a catalyst base. Less pure types of alumina have been shown to be wholly unsatisfactory as a base for a palladium hydrogenation catalyst. A typical analysis of the eta alumina base uses as a support for the palladium hydrogenation catalyst of this invention is as follows:

TABLE I

| Element: | Maximum concentration in parts/million |
|---|---|
| Iron | 75 |
| Lead and tin | 20 |
| Silicon | 40 |
| Potassium | 10 |
| Sodium | 10 |
| Molybdenum | 10 |
| Vanadium | 10 |
| Nickel | 10 |
| Copper | 10 |
| Calcium | 150 |
| Magnesium | 150 |

The metal catalyst on the ultra pure eta alumina support may be platinum, palladium or a combination thereof. The hydrogenation rates may be improved by the use of certain materials as promoters or activators. It is known that the presence of certain metals, certain non-metallic compounds, and metal oxides improve the performance of the catalyst in hydrogenation reactions. The term "activation" is used to indicate that the catalyst has been improved in performance by having minor amounts of metals or metal oxides or carbonates incorporated in the catalyst system. Activation results in improved hydrogenation rate and greater catalyst life. In the present invention, activation of palladium catalyst is obtained by using the oxides or hydroxides of iron, nickel, cobalt, magnesium, aluminium, chromium, vanadium, or tungsten. Any one of any combination of these compounds provide an activating influence. In addition to these materials, the fluorides of boron and silicon may be used as activators. Such activators may be added before, during, or after precipitation of the palladium from the solution as a hydroxide or carbonate. Use of these activators may increase activity of the palladium catalyst by as much as 40%.

The process of preparing a catalyst in this invention involves suspending coarse eta alumina powder in deionized water. An activator may be added at this point as a water soluble solution of the activator metal salt. If an activator is used, a solution of sodium carbonate or sodium hydroxide is then added to precipitate the activator metal basic carbonate or the hydroxide. The palladium is added by preparing a solution of sodium bicarbonate in water. The solution is mixed with the palladium nitrate solution which had been previously diluted to the appropriate concentration.

A large excess of bicarbonate may be used since it has been found that such an excess produces a room-temperature stable palladium system and results in complete control of the catalyst system. It is preferred that the weight ratio of the alkali metal bicarbonate to catalyst metal be between about 15 and 75. After the catalyst metal salt solution is added to the slurry of eta alumina powder, the mixture is heated to about 190° F. and held at this temperature until a test portion when filtered shows no catalyst metal dissolved in the filtrate. This procedure assures that all the catalysti metal has been precipitated. The mass is then reduced. This can be done by the addition of aqueous formaldehyde while maintaining the mass at about 190° F. Other reading agents such as hydrogen, glucose, hydrazine alcohol, glycerin and the like may also be used in this step of the process. After the reduction step, the prepared catalyst is subjected to conventional washing and drying steps.

The concentration of catalyst metal on the eta alumina support should be between about 0.1 and 10% the weight of the support. The use of low concentration is desirable for the hydrogenation step. The higher concentrations are preferred for each of catalyst preparation. It is preferred to prepare the catalyst at high concentration with subsequent dilution to the lower catalyst concentration levels. This dilution technique involves the physical addition and mixing of the eta alumina with the catalyst concentrate. The amount of eta alumina added to the catalyst will depend on the final catalyst concentration desired. The eta alumina will be added to produce a catalyst, having from about 0.10 to about 20% catalyst metal preferably 0.10 to 10% based on the weight of support. The activating metals, when used, are present as about 0.1 to 10% preferably 2 to 5% based on the weight of the support. The invention is further illustrated by the following specific but non-limiting examples.

EXAMPLE 1

A sodium bicarbonate solution was prepared by dissolving 19.3 grams of sodium bicarbonate in 155 ml. of the deionized water. A palladium nitrate solution was prepared by diluting 35.1 ml. of 10% palladium nitrate solution to 147 ml. The diluted palladium nitrate solution was added to the sodium bicarbonate solution and the mixture was heated to 180° F. The mixture was maintained at this temperature with agitation for a period of 20 minutes. At the end of this time, 46 ml. of an 18.3% formaldehyde solution was added to the slurry and the temperature was maintained as 180 to 190° F. for a period of 1¼ hours. The catalyst base was allowed to cool and the paste filtered and washed on the filter with water. The paste was then reslurried with 295 ml. of deionized water and filtered. The wet paste consists of 70 grams (dry basis) of finished catalyst and then contained the equivalent of 5% (dry basis) palladium. The catalyst can be used directly without drying as a catalyst for the hydrogenation of nitro compounds.

EXAMPLE 2

The catalyst activity was determined by measuring the hydrogen adsorption at room temperature and atmospheric pressure of a solution of nitrobenzene in glacial acetic acid containing the catalyst sample. Briefly, this method comprises a determination of the number of milliliters of hydrogen adsorbed per minute per gram of catalyst.

A sample of the catalyst was dried and 0.10 grams of catalyst was added to a reaction flask set up on a shaker. A charge of 4.0 ml. of purified nitrobenzene was added to the flask along with 100 ml. of glacial acetic acid. The reaction flask was secured in the shaker and a gas tight connection made between the flask and the hydrogen supply system. The hydrogen supply system was flushed to remove air and filled with hydrogen. The reaction flask was exposed to an atmosphere of hydrogen at a pressure of atmospheric to 5 mm. of water for a period of 5 minutes. The amount of hydrogen adsorbed was calculated and the hydrogen adsorption step was repeated for two additional 5 minute intervals.

The catalyst activity was calculated using the formula $$\text{activity} = \frac{\text{ml. of } H_2 \text{ adsorbed in time } t}{tx \text{ weight of catalyst}}$$

In practice it has been found that the mechanics of attaining a steady-state shaking action and the possible existence of a momentary induction period cause the absorption during the first 5 minute period to be slightly lower than in succeeding periods. It can be seen that if a 0.100 gram sample (DB) is used and the absorption over a 10 minute interval is used for calculation, the denominator of the above formula is unity. In this case, therefore, the activity of the catalyst is numerically equal to the amount of hydrogen absorbed in the interval from 5 to 15 minutes of test. Thus, the calculation is reduced to a simple addition of the two net absorptions. Thus, activities are expressed in ml. of hydrogen adsorbed per minutes per grams of catalyst. The experimental error in the test procedure is in the order of ±50 ml. of hydrogen per minute per gram at the activity levels in question. The following results were obtained in two laboratory preparations of the palladium-eta alumina catalyst.

TABLE II

| Run number: | Activity in ml. of hydrogen/min./gram | |
| --- | --- | --- |
| 1 | 1210 | |
| 2 | 1095 | |
| 3 | 1085 | 1240 |

The typical activity values for this palladium catalyst on eta alumina compare very favorably with the initial activity of the carbon supported catalyst. The carbon catalysts have been found to have activities in the order of 1100 to 1200 ml. of hydrogen per minute per gram. The high purity eta alumina base thus gives satisfactory conversion and has the advantages of being noncarbonaceous, having a higher density and greatly improved attrition resistance.

What is claimed is:
1. A process for the hydrogenation of nitrobenzene wherein nitrobenzene is mixed with a noble metal catalyst selected from the group consisting of platinum and palladium deposited on an ultra pure eta alumina support, said eta alumina support having an impurity content only on the order of about that represented in Table I, at a concentration range of about 1 to 10% by weight of said support which has a surface area of 100 to 500 m.²/g. and reducing the resulting mixture with hydrogen.

References Cited

UNITED STATES PATENTS

| | | | |
|---|---|---|---|
| 3,053,760 | 9/1962 | Henke et al. | 252—465 |
| 3,173,856 | 3/1965 | Burton et al. | 252—466 |
| 3,093,685 | 6/1963 | Hort et al. | 260—580 |

FOREIGN PATENTS 895,197  5/1962  Great Britain.

CHARLES B. PARKER, Primary Examiner

R. L. RAYMOND, Assistant Examiner

U.S. Cl. X.R.

252—466; 260—580, 690

PO-1050
(5/69)

UNITED STATES PATENT OFFICE
CERTIFICATE OF CORRECTION

Patent No. 3,472,897     Dated  October 14, 1969

Inventor(s) James N. Pryor and Orville A. Wunderlich

It is certified that error appears in the above-identified patent and that said Letters Patent are hereby corrected as shown below:

Column 4, line 75, the number "1" should read -- .1--.

SIGNED AND
SEALED
JUN 30 1970

(SEAL)
Attest:

Edward M. Fletcher, Jr.
Attesting Officer

WILLIAM E. SCHUYLER, JR.
Commissioner of Patents